United States Patent
Strogov et al.

(10) Patent No.: US 12,423,411 B2
(45) Date of Patent: Sep. 23, 2025

(54) VIRTUAL FILE HONEY POTS FOR COMPUTING SYSTEMS BEHAVIOR-BASED PROTECTION AGAINST RANSOMWARE ATTACKS

(71) Applicant: Acronis International GmbH, Schaffhausen (CH)

(72) Inventors: Vladimir Strogov, Singapore (SG); Aliaksei Dodz, Singapore (SG); Oleg Ishanov, Singapore (SG); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 141 days.

(21) Appl. No.: 18/519,785

(22) Filed: Nov. 27, 2023

(65) Prior Publication Data
US 2025/0173423 A1    May 29, 2025

(51) Int. Cl.
| | |
|---|---|
| G06F 15/16 | (2006.01) |
| G06F 9/54 | (2006.01) |
| G06F 21/53 | (2013.01) |
| G06F 21/55 | (2013.01) |
| G06F 21/56 | (2013.01) |
| H04L 29/06 | (2006.01) |

(52) U.S. Cl.
CPC ............ G06F 21/53 (2013.01); G06F 21/552 (2013.01); G06F 21/566 (2013.01); *G06F 2221/034* (2013.01)

(58) Field of Classification Search
CPC ...... G06F 21/53; G06F 21/552; G06F 21/566; G06F 2221/034

USPC .............................................................. 726/1
See application file for complete search history.

(56) References Cited

U.S. PATENT DOCUMENTS

| | | | | |
|---|---|---|---|---|
| 10,409,986 | B1* | 9/2019 | Natanzon | G06F 12/1408 |
| 10,503,897 | B1* | 12/2019 | Striem-Amit | G06F 21/552 |
| 10,609,066 | B1* | 3/2020 | Nossik | H04L 63/1408 |
| 10,769,278 | B2* | 9/2020 | Chelarescu | G06F 21/552 |
| 10,917,416 | B2* | 2/2021 | Chelarescu | H04L 63/0428 |
| 10,938,854 | B2* | 3/2021 | Strogov | H04L 63/1416 |
| 10,986,126 | B2* | 4/2021 | Luo | H04W 4/70 |
| 11,010,469 | B2* | 5/2021 | Aharoni | G06F 21/554 |

(Continued)

FOREIGN PATENT DOCUMENTS

| | | |
|---|---|---|
| CN | 114268452 A | 4/2022 |
| CN | 114499915 A | 5/2022 |

(Continued)

*Primary Examiner* — Hamza N Algibhah
(74) *Attorney, Agent, or Firm* — ESPE Legal Consultancy FZ-LLC (57) ABSTRACT

Systems and methods for ransomware protection in advanced injection-based attacks. Events from a driver are analyzed to identify a potentially malicious actor. A confidence level is calculated for the potentially malicious actor identification to weigh the probability that the actor is malware or a source of malware. Behavior associated with the potentially malicious actor can be collected, if it is likely that the potentially malicious actor is associated with malware, such as if the confidence level is over a predetermined threshold. Subsequently, one or more virtual honeypots are generated for the suspicious processes and the response to the virtual honeypots is included in anti-ransomware heuristic analysis.

20 Claims, 4 Drawing Sheets

(56) References Cited

U.S. PATENT DOCUMENTS

| | | | |
|---|---|---|---|
| 11,032,319 B1* | 6/2021 | Roundy | G06F 21/62 |
| 11,349,855 B1* | 5/2022 | Amit | G06F 9/547 |
| 11,580,221 B2* | 2/2023 | Arora | G06F 21/567 |
| 11,611,586 B2 | 3/2023 | Strogov et al. | |
| 11,645,383 B2* | 5/2023 | Guri | G06F 21/54 |
| | | | 726/22 |
| 11,750,651 B2* | 9/2023 | Ries | H04L 63/0263 |
| | | | 726/22 |
| 12,079,330 B2* | 9/2024 | Chesla | G06N 7/01 |
| 2018/0189490 A1* | 7/2018 | Maciejak | G06F 21/566 |
| 2018/0248896 A1* | 8/2018 | Challita | G06F 21/554 |
| 2020/0089876 A1* | 3/2020 | Aharoni | G06F 21/554 |
| 2020/0204589 A1* | 6/2020 | Strogov | H04L 63/1416 |
| 2021/0160284 A1* | 5/2021 | Strogov | H04L 63/0245 |
| 2022/0147622 A1* | 5/2022 | Chesla | G06N 7/01 |
| 2022/0294822 A1* | 9/2022 | Shmelev | H04L 63/1491 |
| 2023/0078950 A1* | 3/2023 | Aharoni | G06F 21/554 |
| | | | 726/23 |
| 2023/0132303 A1* | 4/2023 | Woo | G06F 21/566 |
| | | | 726/23 |
| 2023/0362194 A1* | 11/2023 | Lai | H04L 63/1491 |
| 2023/0401125 A1* | 12/2023 | Madan | G06F 11/1453 |
| 2024/0111861 A1* | 4/2024 | Yadav | G06F 21/554 |
| 2024/0126880 A1* | 4/2024 | Hironaka | G06F 21/566 |
| 2024/0248803 A1* | 7/2024 | Rothschild | G06F 11/1458 |
| 2024/0256658 A1* | 8/2024 | Madan | G06F 21/554 |
| 2025/0106251 A1* | 3/2025 | Strogov | H04L 63/1491 |

FOREIGN PATENT DOCUMENTS

| | | | | |
|---|---|---|---|---|
| CN | 114499915 B | | 12/2022 | |
| CN | 114978731 B | | 6/2023 | |
| JP | 2025508439 A | * | 3/2025 | G06F 21/54 |
| WO | WO-2023232246 A1 | * | 12/2023 | G06F 21/562 |

* cited by examiner

VIRTUAL FILE HONEY POTS FOR COMPUTING SYSTEMS BEHAVIOR-BASED PROTECTION AGAINST RANSOMWARE ATTACKS

TECHNICAL FIELD

The current invention relates to the field of computer security. More particularly, The invention relates to the detection and remediation of malware.

BACKGROUND

Modern computing systems face a critical challenge in safeguarding their valuable data and operations against the ever-evolving threat of malware and ransomware attacks. Ransomware, for example, is typically malicious software that encrypts or blocks access to a system's files until a ransom is paid. Ransomware attacks have become a significant menace to computing systems, causing financial losses, operational disruptions, and potential data breaches.

One of the conventional ways by which malicious processes are detected is with file honeypots. Honeypots are decoy files injected into filesystem directories to attract and identify suspicious processes. In particular, file honeypots can be inserted on a storage device along with real files to bait suspicious processes to reveal themselves as malware.

However, there is a danger that a malicious thread may be injected to run inside an otherwise trusted process. The problem of protection from "injected" malware is typically more complex than protection from independent malicious processes because typical honeypots do not identify malicious threads injected into benign processes.

Therefore, there is a need for improved malware and ransomware protection to effectively detect malware. In addition, there is a need for systems and methods that dynamically respond to a diversity of ransomware behavior and types and yet be resource-efficient and effectively protect a computing system from malware without adding to system overhead.

SUMMARY

Embodiments described or otherwise contemplated herein substantially meet the aforementioned needs of the industry. Embodiments described herein include systems and methods for protecting computing systems (CS) against ransomware attacks using virtual file honeypots (VFHs). In an embodiment, virtual file honeypots are generated specifically for potentially malicious processes or injected threads in benign processes.

Storage consumption is reduced for VFHs targeted at injected threads compared to the file snapshots typically used for general honeypots. For example, storage or file structure is not created for a VFH. Backup operations do not see such VFHs, so VFHs are not included in backup storage. VFHs thereby protect a computing system from malware without adding to system overhead. In an additional related advantage, the use of VFHs is resource-efficient because the use of VFHs does not add to system overhead.

Ransomware is detected earlier compared to existing solutions. For example, by generating a plurality of VFHs targeted at a suspicious thread, the suspicious thread can be detected before the suspicious thread gets to real files.

In particular, embodiments utilize tailored security parameters for VFHs generation such that VFHs can be generated to be targeted for concrete cases, such as CS environment information, a plurality of characteristics of an injected thread, auxiliary information, or an execution stack. In other words, VFHs are created in a way to be the most attractive for a threat.

In an embodiment, a method for protecting a computing system (CS) against ransomware attacks using virtual file honeypots (VFHs) under virtual honeypot driver control comprises monitoring one or more operations on the CS; determining whether the one or more operations include any operations that are suspicious according to a policy; identifying a potentially malicious actor associated with the one or more operations that are suspicious; calculating a confidence level for the potentially malicious actor identification; collecting behavior information and characteristics of the potentially malicious actor, wherein characteristics include at least one of: a certificate; a hash of a file, a binary file, or a reputation; identifying at least one process or injected thread in a trusted process created by the potentially malicious actor on the CS; when the confidence level is above a predefined threshold, generating VFH security parameters by applying a machine learning module to at least one of: a CS environment information, behavior information of the potentially malicious actor, the characteristics of the potentially malicious actor, or auxiliary information; generating a plurality of VFHs based on the security parameters; providing the at least one process or injected thread in a trusted process with the plurality of VFHs mixed with real system files; and detecting the potentially malicious actor as malware by performing a heuristic analysis.

In an embodiment, a system for protecting a computing system (CS) against ransomware attacks comprises a virtual honeypot driver configured to monitor one or more operations on the CS, a behavior engine configured to: determine whether the one or more operations include any operations that are suspicious according to a policy, identify a potentially malicious actor associated with the one or more operations that are suspicious, calculate a confidence level for the potentially malicious actor identification, collect behavior information and characteristics of the potentially malicious actor, wherein characteristics include at least one of: a certificate; a hash of a file, a binary file, or a reputation, and identifying at least one process or injected thread in a trusted process created by the potentially malicious actor on the CS; a machine learning module operably coupled to the virtual honeypot driver and configured to generate VFH security parameters by applying a machine learning module to at least one of: a CS environment information, behavior information of the potentially malicious actor, the characteristics of the potentially malicious actor, or auxiliary information when the confidence level is above a predefined threshold, wherein the virtual honeypot driver is further configured to: generate a plurality of virtual file honeypots (VFHs) based on the security parameters, and provide the at least one process or injected thread in a trusted process with the plurality of VFHs mixed with real system files, and wherein the behavior engine is further configured to detect the potentially malicious actor as malware by performing a heuristic analysis.

In an embodiment, a method for protecting a computing system (CS) against ransomware attacks comprises creating a CS event by grouping at least two CS operations; determining that the CS event comprises at least one suspicious operation according to a behavior engine analysis; identifying a potentially malicious actor associated with the at least one suspicious operation; calculating a confidence level for the potentially malicious actor identification; collecting behavior information and characteristics of the potentially malicious actor; when the confidence level is above a threshold, generating virtual file honeypot (VFH) security parameters using a machine learning module; generating at least one VFH based on a plurality of security parameters; and detecting the potentially malicious actor as malware based on the at least one suspicious operation interaction with the VFH.

BRIEF DESCRIPTION OF THE DRAWINGS

The invention may be more completely understood in consideration of the following detailed description of various embodiments in connection with the accompanying figures, in which.

DETAILED DESCRIPTION

In an embodiment, a VFH system is deployed to prevent ransomware attacks. In an example, the ransomware is designed by a hacker to encrypt system files such that a decryption key known only to the hacker can be sold at an extortionate price to the owner of the files. The computing system generally comprises a storage device with a plurality of files that are accessed for reading and writing by a variety of processes in user space. Access control takes place in kernel space and employs a virtual honeypot driver to manage virtual file honeypot creation.

The virtual honeypot driver sits between processes seeking to access files on a storage device and the storage device itself. The virtual honeypot driver is configured to identify distinguishing parameters of the CS environment or the potentially malicious actor and its activity. One or more of these distinguishing parameters are used by the virtual honeypot driver when virtual file honeypots are created to ensure that the virtual file honeypots match the CS environment or potentially malicious actor activity.

Heuristic analysis takes place by examining file-related behavior and characteristics indicative of malicious activity. In the context of ransomware, for example, heuristic analysis aims to detect ransomware attacks by identifying patterns and behaviors that deviate from normal or expected file operations. Certain kinds of heuristic analysis are typically performed when analyzing ransomware attacks for indicia of malicious intent. One example is rapid mass encryption, where a large number of files are rapidly encrypted within a short period. Such behavior is indicative of ransomware trying to encrypt as many files as possible as fast as possible. In addition, determining that encryption of the data is occurring can be based on monitoring the entropy of the monitored data. If the entropy of the data is observed to be growing faster than a predetermined threshold rate, the entropy growth rate can be identified as a sign of ongoing encryption. Another example is the use of unusual file extensions. Ransomware often appends new and unusual file extensions to encrypted files. Heuristic analysis monitors for sudden and widespread changes in file extensions across the system. Inconsistent file modification is another sign of malware. Ransomware may modify files across different directories or drives in an inconsistent manner. Heuristic analysis identifies unusual modification patterns that suggest malicious file encryption. Simultaneous file access is another sign of malware. When multiple files are accessed simultaneously by a process or thread that typically doesn't exhibit such behavior, heuristic analysis can flag such file access as suspicious. Changes in file creation/modification timestamps also suggest ransomware attacks, which can result in the modification of file timestamps, particularly creation and modification times. Heuristic analysis detects abrupt and widespread changes in these timestamps. Another sign of malware is unusual file activity at off-hours. Ransomware attacks are often timed to occur during off-peak hours to avoid immediate detection. Heuristic analysis can give increased scrutiny to file activities that occur at unusual times. A high volume of file writes is also a sign of malware. Ransomware encrypts files by writing encrypted data. Thus, heuristic analysis looks for an unusually high volume of file write operations.

In an embodiment, heuristics used in classification include patterns of full file read, combined delete and create operations, renaming special file extensions, or MIME type changes as the result of file write operations. These operations, when encountered, contribute to the classification of a session as potentially malicious or unsafe. In an embodiment, full-read, delete, and create as a classification heuristic accounts for matching create operations for the full read and delete operation pairs in order to reduce false positives.

These heuristics require access to the file content after modification. The virtual honeypot driver stores file content information after modification. Thus, there is no need to preserve content before the modification because the virtual honeypot driver knows how the content was initially generated.

The virtual honeypot driver presents virtual file honeypots to lure potential malicious processes or injected threads acting as ransomware in benign processes. The inserted virtual file honeypots are used for heuristics and are not snapshotted or backed up.

Although a traditional file honeypot may be considered a "virtual" file in the sense that it mimics a real system file, the term "virtual" in the context of a virtual file honeypot does not concern mimicry of real system files. The virtual aspect of a virtual file honeypot driver refers to technical characteristics of the file honeypot. For example, a virtual file honeypot differs from traditional honeypots because it lacks backup storage or any physical presence of its own within the real file system to be protected. Further, a virtual file honeypot is also virtual in the sense that it is generated on-demand in response to a process and may have variable characteristics depending on the specific system or context. Thus, a virtual file honeypot is ephemeral in that it is created on-demand and does not persist in system storage.

In particular, embodiments solve the problem of a malicious actor (e.g. process) injecting threads into benign processes, such that the injected threads do the ransomware work under the hood of the benign process. Embodiments are configured to analyze events from a driver to identify a potentially malicious actor. A confidence level can be calculated for the malicious actor identification to weigh the probability that the actor is malware or is a source of malware. Behavior associated with the potentially malicious actor can be collected, if it is likely that the potentially malicious actor is associated with malware, such as if the confidence level is above a predetermined threshold. Then, the suspicious process of the identified potentially malicious actor or the process or chain of processes or threads created by the potentially malicious actor process are identified. Subsequently, one or more virtual honeypots can be generated for the suspicious process or threads and included in anti-ransomware heuristic analysis. Accordingly, systems and methods for protecting computing systems against ransomware attacks using virtual file honeypots described herein operate in a phased approach, that will be described further herein.

Figure 1:
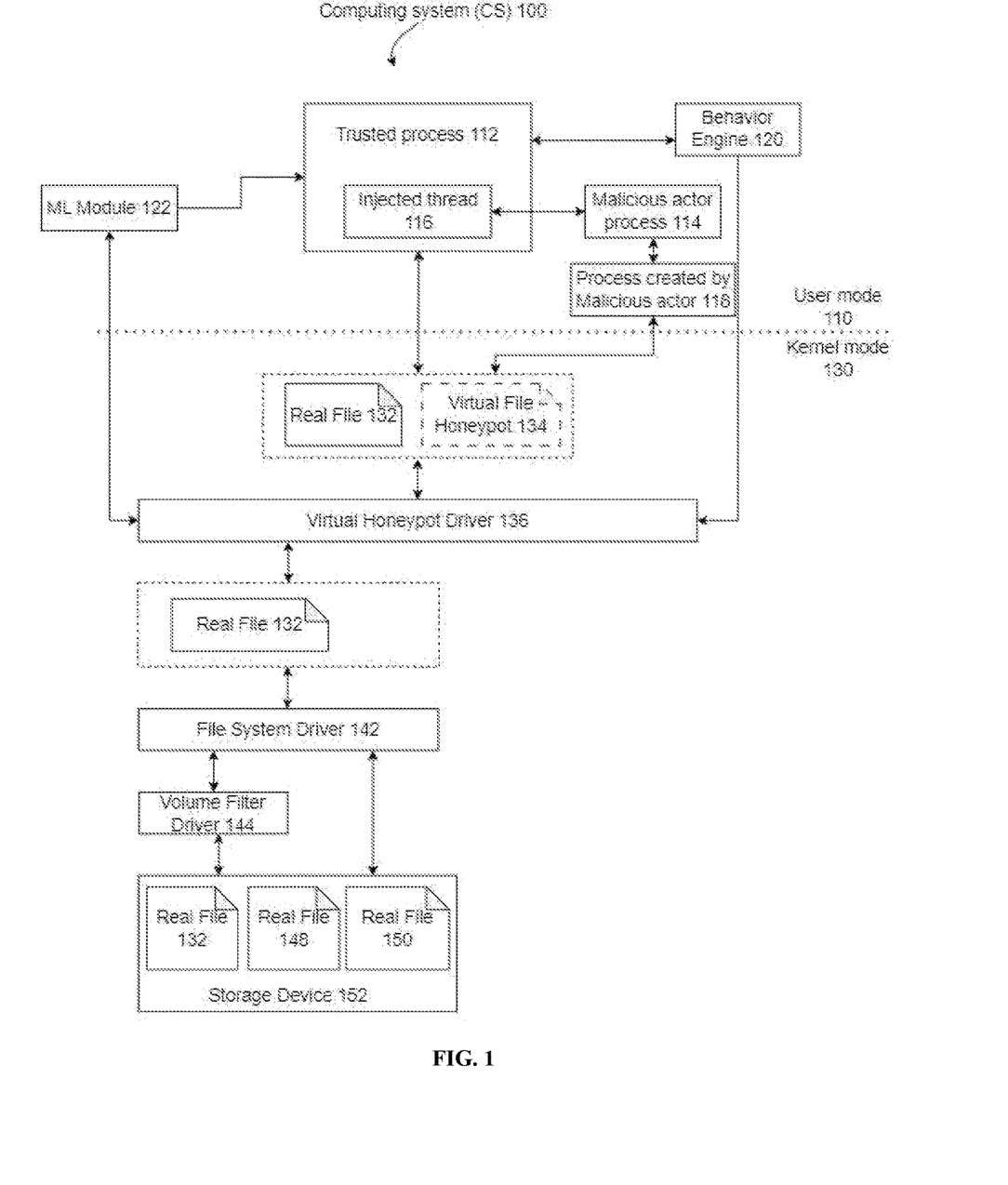
FIG. 1 is a block diagram of a computing system for ransomware protection in injection-based attacks, according to an embodiment.

Referring to FIG. 1, a block diagram of a computing system 100 for ransomware protection in injection-based attacks is depicted, according to an embodiment. Computing system 100 generally comprises one or more processors and nonvolatile storage media in a networked configuration so that computing resources are available to system users. System 100 includes a user mode 110 where applications and processes originate. In FIG. 1, for example, trusted process 112 runs in user mode 110 along with a number of possible processes (e.g. malicious actor process 114, process (or chain of processes) 118 created by malicious actor process 114, or behavior engine 120). Operating system (OS) thread processes (not depicted) also run in user mode 110.

Trusted process 112 is a process configured to execute on CS 100. In an embodiment, trusted process 112 is a known trusted process. For example, trusted process 112 can be identified as safe/trusted according to a valid digital signature associated with trusted process 112.

Malicious actor 114 can comprise a malicious actor, process, thread, object, device, user, process, etc. In an embodiment, malicious actor 114 is capable of injecting one or more threads into trusted process 112. In an embodiment, malicious actor 114 can be a process executing on CS 100 and can create one or more additional processes on CS 100. In another example, malicious actor 114 can be a device communicatively coupled to CS 100, such as over a network. Though malicious actor is referred to herein as both "malicious actor" and "malicious actor process" interchangeably, it is appreciated that malicious actor can comprise any of the aforementioned objects.

Injected thread 116 is a thread injected into trusted process 112 by malicious actor 114. In an embodiment, injected thread 116 is a malicious thread operating under the hood of trusted process 112. Accordingly, the intent by malicious actor 114 is to disguise the malicious activities of injected thread 116.

Process 118 is a process created by malicious actor process 114. In an embodiment, process 118 is a malicious process operating in user mode 110 of CS 100. For context, malicious actor process 114 can inject thread 116 into trusted process 112, as previously described. In an embodiment, malicious actor process 114 can use its existing process 114, and create process 118 or create a chain of processes 118.

Behavior engine 120 is configured to identify suspicious operations of one or more processes of CS 100. For example, behavior engine 120 is configured to receive events from virtual honeypot driver 136, analyze the received events, and determine whether one or more operations associated with an event are suspicious as malware. In an embodiment, behavior engine 120 can utilize the output of detected events by virtual honeypot driver 136 for monitoring processes.

In an embodiment, determining whether one or more operations associated with an event are suspicious as malware is conducted according to a policy. Behavior engine 120 can be configured to learn behaviors, patterns, or files that are vulnerable. Accordingly, behavior engine 120 can conserve resources by only tracking files that are vulnerable.

According to one aspect, behavior engine 120 tracks files based on configured policies. One policy may indicate, for example, that the files to be tracked include those files that are vulnerable such as system data files (e.g., firmware files, settings and the like). The policies can include file paths and names, file extensions, or the like for identifying vulnerable data. In embodiments, a policy can include a plurality of behavior rules, for example, a separate rule for handling files and a separate rule for handling process patterns.

In an embodiment, behavior engine 120 adapts and improves its understanding of what constitutes suspicious or malicious behavior over time. Machine learning techniques can be utilized.

Machine learning refers generally to training computers to make decisions from data without being explicitly programmed. It involves training algorithms on data sets to recognize patterns, make predictions, or perform tasks, becoming more accurate as they process more data. A variety of machine learning techniques may be employed in alternative embodiments. Examples include Supervised Learning, where models learn from labeled data. This includes linear regression for predicting continuous outcomes, logistic regression for classification tasks, and more complex neural networks. Unsupervised Learning, which works with unlabeled data to uncover hidden patterns, may also be used. Techniques like k-means clustering may be used to group similar data points, while Principal Component Analysis is instrumental in reducing the dimensionality of large datasets, aiding in data visualization and efficiency. Semi-Supervised Learning is another option. This technique merges the concepts of supervised and unsupervised learning. Another possible technique is Reinforcement Learning, characterized by using agents that learn optimal behaviors through trial and error in a specific environment. Other possible techniques include Deep Learning (multi-layered neural networks to process large volumes of data), Convolutional Neural Networks (CNNs), and Recurrent Neural Networks (RNNs). Transfer Learning is yet another alternative that involves taking a pre-trained model, like the text-processing GPT, and fine-tuning it for specific tasks. Ensemble Methods, which include Bagging, Boosting, and Stacking, enhance model performance by combining predictions from multiple models. In some embodiments, algorithms like Random Forest (a type of Bagging) and Gradient Boosting Machines can be used for predictive modeling. Other machine learning techniques may also be used, either alone or in combination with the techniques described above, as long as they are consistent with the object and purpose of the invention. The disclosed embodiments are given as examples of possible implementations and embodiments. The invention is not limited to these examples.

For example, behavior engine 120 can utilize one or more of the following features to improve its performance of suspicious or malicious behavior.

Behavior Patterns. In an embodiment, behavior engine 120 observes various activities and operations within the computing system. Behavior engine 120 can analyze patterns in file interactions, process executions, and other system behaviors.

Machine Learning Algorithms. Behavior engine 120 can employ machine learning algorithms to analyze historical data. Behavior engine 120 can use supervised learning, unsupervised learning, or a combination to recognize patterns associated with normal and malicious behavior.

Feedback Loop. Embodiments of the system can implement a feedback loop to receive information about confirmed malicious activities. This feedback helps the behavior engine 120 adjust its algorithms and rules for better accuracy.

In an embodiment, behavior engine 12 can implement various policies. A number of example policies are provided below.

File tracking policies are configured to specify which files to track based on vulnerability. In an example, system data files (firmware files, settings) that are commonly targeted by malware can be tracked.

Rule-based policies can include a set of behavior rules for different aspects of system activity. In an example, separate rules can be used for file handling and process pattern analysis.

File path and name policies include specific file paths, names, or file extensions to identify vulnerable data. In an example, all files in a certain directory or files with specific extensions known to be vulnerable can be tracked and utilized.

Behavior rules for processes policies can include rules for identifying suspicious process patterns. In an example, processes that attempt unusual or unauthorized activities, such as injecting code into other processes can be monitored.

Dynamic policy adjustment can be utilized. Policies are not static; they can be dynamically adjusted based on the evolving threat landscape. For example, periodic updates to policies based on the latest threat intelligence and system vulnerabilities can be utilized.

Policies with adaptive thresholds can set adaptive thresholds for suspicious behavior based on historical data. For example, the sensitivity of the system based on the current threat level can be adjusted.

User-defined policies can be implemented by users or administrators to define custom policies. For example, organizations can tailor the system's behavior analysis to specific needs.

In response to an event being determined to be suspicious of malware of behavior engine 120 (with a confidence level below the predetermined threshold), one or more VFHs can be started by virtual honeypot driver 136. More particularly, VFH parameters can be generated, then VFHs can be created. For example, behavior engine 120 can command virtual honeypot driver 136 to start VFH creation (beginning with VFH parameters).

In an embodiment, behavior engine 120 in coordination with virtual honeypot driver 136 implements "silent detect." Specifically, behavior engine 120 detects suspicious activity, starts VFHs, but continues monitoring. Silent detect therefore ensures additional suspicious activities are detected while protecting against already-identified suspicious activity.

In an embodiment, behavior engine 120 is further configured to identify a potentially malicious actor process associated with the suspicious operations. For example, the injector of an injected thread can be identified as a potentially malicious actor.

In an embodiment, the injector (in injector cases) is the potentially malicious actor (process). The potentially malicious actor process can be identified by analyzing the context of one or more callback operations. Further, in embodiments, an injected thread is identified by performing stack trace analysis (e.g. analysis on the execution stack).

In an embodiment, behavior engine 120 is further configured to calculate a confidence level for the potentially malicious actor identification. In an embodiment, the confidence level operates as a preliminary verdict of maliciousness. For example, if the confidence level is higher than a predetermined threshold, the potentially malicious actor is associated with a preliminary indication of malware. In embodiments, the confidence level can comprise a preliminary verdict in percentages, for example, 65% confidence of malware. In such an example, if the threshold is 60%, then VFHs are generated. In other embodiments, the threshold can be less than 30%, 30%, 35%, 40%, 45%, 50%, 55%, 60%, 65%, 70%, or 75% or greater. In embodiments, other thresholds from 0%-100% can be utilized depending on the type of actor, type of CS, type of process, etc. In embodiments, different thresholds can be applied for different actors within a given CS. In other embodiments, other thresholds in comparison to legitimate actors can be made, such as a comparison against a confidence of legitimacy such that below the legitimacy threshold is a preliminary indication of malware. Accordingly, behavior engine 120 is configured to determine whether one or more VFHs should be generated and deployed. Moreover, system 100 implements dynamic configuration and generation of VFHs based on confidence level of potential malware detection.

In an embodiment, behavior engine 120 can calculate a confidence level for the malicious actor identification by matching potentially malicious actor operations using a machine learning module applied to operations on the CS over a predetermined period of time. In this context, 'matching' includes the use of a machine learning module applied to operations on the computing system over a predetermined period of time. The associated machine learning module is trained to recognize patterns indicative of malicious behavior by comparing observed operations of a potentially malicious actor with a dataset containing examples of confirmed malicious and non-malicious activities. The confidence level is then calculated based on the module's assessment of the similarity between the observed operations and the learned patterns, aiding in the identification of potential threats.

In an embodiment, behavior engine 120 can calculate a confidence level for the malicious actor (process) by using a Portable Executable (PE) analysis machine learning module trained on confirmed ransomware detections. The behavior engine can incorporate a PE analysis machine learning module, which is specifically designed for the analysis of Portable Executable (PE) files commonly found in Windows environments. This PE analysis machine learning module can be trained on a dataset comprising confirmed instances of ransomware detections. In operation, the PE analysis machine learning module leverages its trained knowledge to recognize patterns indicative of ransomware behavior within PE files. The calculated confidence level for the malicious actor identification is based on the alignment of the observed behavior with the patterns learned during the training phase.

In an embodiment, behavior engine 120 can calculate a confidence level for the malicious actor identification by analyzing a certificate of the potentially malicious actor by comparing it with a list of known certificates involved in malicious activity.

A digital certificate is a cryptographic credential that serves to verify the identity of the entity that holds it. In the context of computing systems, processes and threads often possess digital certificates, and these certificates are used for authentication and to establish trust.

In an embodiment, certificate comparison can include first, extraction of certificate information. The behavior engine 120 (or other suitable module) retrieves the digital certificate associated with the potentially malicious actor. This certificate typically contains information such as the entity's identity, public key, and other relevant details.

Next, behavior engine 120 compares the certificate associated with the potentially malicious actor to certificates involved in potentially malicious activity. The behavior engine maintains a list of known certificates involved in potentially malicious activity. These certificates are pre-identified as being associated with malicious actors or activities, such as a trusted certificate that was compromised earlier. During the certificate comparison, the extracted certificate is cross-referenced with this list.

Finally, a confidence level calculation can be made. Based on a number of malicious incidents, the behavior engine calculates a confidence level for the potentially malicious actor identification. If the actor's certificate matches a known potentially malicious certificate, the confidence level may be higher, indicating a greater likelihood of malicious intent.

The embodiment of FIG. 1 is described above with behavior engine 120 configured to calculate a confidence level. However, in embodiments, a confidence level can be calculated by ML module 122, behavior engine 120, or VFH driver 136 as well. For example, in such embodiments, the appropriate information discussed above with respect to behavior engine 120 can remain at the other components or be passed to those components for confidence level calculation.

In an embodiment, behavior engine 120 is further configured to collect information to be used for generation of VFHs. In an embodiment, behavior engine 120 can collect behavior information and characteristics of the potentially malicious actor. In an embodiment, behavior information can include malicious operations information detected in earlier system operations, such as that by virtual honeypot driver 136 or behavior engine 120. In an embodiment, characteristics of the potentially malicious actor can include certificate information; hash of an associated file, a binary file, a reputation local to the CS or a network-based global reputation.

In an embodiment, virtual honeypot driver 136 is configured to monitor operations on CS 100. Virtual honeypot driver 136 is configured to communicate operations in the form of events to behavior engine 120. For example, virtual honeypot driver 136 can create events by monitoring operations, grouping various operations, applying one or more filters, and utilizing conditional operations.

In an embodiment, event creation includes virtual honeypot driver 136 monitoring various operations on computing system 100 and translating the operations into events for behavior engine 120. Grouping, filtering, and conditional operations are methods used to organize, refine, and contextualize these operations, providing a more meaningful and focused dataset for subsequent analysis by the behavior engine. For example, grouping is directed at categorizing operations into sets based on criteria to identify patterns. Filtering is directed at selecting or excluding operations based on predefined criteria to focus on relevant activities. Conditional operations are directed at applying rules to dynamically adapt criteria for event creation based on context or specific conditions.

In an embodiment, virtual honeypot driver 136 provides malicious actor process 114 or injected thread 116 (e.g. linked to malicious actor process 114) or process 118 created by malicious actor process 114 access to virtual file honeypots. In other embodiments, virtual honeypot driver 136 provides access to real files mixed with virtual file honeypots. For purposes of illustration, virtual file honeypot 134 and real file 132 are representative. Virtual file honeypot 134 is generated by virtual honeypot driver 136 with at least one parameter specific to the computer system 100, or injected thread 116, or process 114 or 118. In this way, a VFH can be targeted to the potentially malicious object. No copy or version of virtual file honeypot 134 is stored on storage device 152. Real file 132 on storage device 152 is obtained by virtual honeypot driver from file system driver 142, either directly or by way of volume filter driver 144. Thus, virtual honeypot driver 136 is able to serve both real files and virtual file honeypots to a process requesting access to storage device 152. Process requests lack direct access to storage device 152 and cannot tell the difference between real files and virtual file honeypots. However, virtual honeypot driver 136 can monitor activity on the virtual file honeypots to determine whether a given thread (or process, as operating with an injected thread) is acting on files in a way indicative of malware. For example, virtual honeypot driver 136 can monitor activity on the honeypots by injected thread 116, malicious actor process 114, or process 118 created by malicious actor process. In embodiments, virtual honeypot driver 136 can monitor activity on the honeypots from any other object associated with the suspicious operations.

Real file 132 is also managed in kernel mode 130 by file system driver 142 and volume filter driver 144. Both drivers 142 and 144 manage real files 132, 148, and 150 on storage device 152. For purposes of illustration, only real files 132, 148, and 150 are shown in FIG. 1. In most implementations, the number of files will be much larger. File system driver 142 manages the entire storage device 152 and its filesystems. Volume filter driver 144 manages volumes within those filesystems. The volume filter driver 144 detects when changes by a file request are made on a block level of the storage and generates a backup file by copying original values of the changed sectors to free space within data storage according to a copy-on-write (COW) operation. In a copy-on-write operation, when the modification request is made, the original data may be copied into a new storage area, and then the original data block is modified.

Virtual honeypot driver 136 protects the files on storage device 152 by providing injected thread 116 (that may be malware) or process 118 deployed by malicious actor process 114 or malicious actor process 114 with at least one VFH and real system files. In the embodiment shown in FIG. 1, virtual honeypot driver 136 has already been configured and has already identified CS 100 and actor 114 parameters. Injected thread 116 has been identified and has been evaluated to preliminarily be indicative of malware (for example, by behavior engine 120). Virtual honeypot driver 136 accordingly provides virtual file honeypots to injected thread 116 or process 118 on-demand. The mix of real files and virtual file honeypots are represented in FIG. 1 by real file 132 and virtual file honeypot 134. The on-demand virtual file honeypots are generated by virtual honeypot driver 136 to have characteristics and parameters such that they are indistinguishable from real system files to would-be malicious agents.

Machine learning module 122 interacts with virtual honeypot driver 136 to improve generation of virtual file honeypots by virtual honeypot driver 136. For example, in an embodiment ML module 122 uses a machine learning model trained to identify and predict details about files in CS 100. For example, patterns in file naming, structure, and content on storage device 152 can be used to train a machine learning model associated with ML module 122 so that virtual honeypot driver 136 can use the results to create plausible sounding virtually file honeypots with file names, representative file structures, and file content that closely resembles real files on storage device 152.

Accordingly, ML module 122 is configured to generate VFH security parameters for subsequent creation of VFHs. In an embodiment, ML module 122 can utilize at least one of CS 100 environment information, behavior information associated with malicious actor 114, malicious actor 114 characteristics (hash, binary file, certificate), or auxiliary information.

In an embodiment, ML module 122 is integral to the generation of VFH security parameters. VFH security parameters are essential for the creation and deployment of VFHs within computing system 100. ML module 122 leverages a diverse set of data sources to formulate security parameters, enhancing the system's ability to safeguard against ransomware attacks and other malicious activities. In embodiments, ML module 122 can draw upon the following sources to derive the VFH security parameters.

CS 100 Environment Information: includes data related to the computing system's type, name, version, operating system type, and operating system version. Understanding the CS environment is vital for tailoring the security parameters to the specific context in which the system operates.

Behavior information associated with the potentially malicious actor can include an actor certificate, one or more files associated with the actor, and a reputation (e.g. local to CS 100 or a global reputation). In embodiments, behavior information can include information detected or otherwise sensed or observed in previous operations associated with potential malicious operations.

Malicious Actor 114 characteristics: information about the malicious actor, such as hash values, binary file details, and certificates associated with their activities, can be considered by the ML module 122. Such characteristics help in profiling potential threats and informing the VFH security parameters.

In the context of VFHs generation for threat detection and mitigation, malicious actor characteristics such as hash values, binary file details, and certificates play an important role in enhancing the security system's ability to protect against ransomware attacks and other forms of malware. These characteristics can be specifically utilized during VFHs generation.

For example, malicious actor's hash values (e.g. identification of the potential malicious actor) are valuable indicators. During VFHs generation, the history of the concrete malicious actor's hash can be obtained to identify the potential malicious intent and generate specific VFHs using obtained knowledge.

Accordingly, hash whitelisting and blacklisting can be utilized. Embodiments can maintain a database of whitelisted and blacklisted hash values. Whitelisted hashes correspond to legitimate files and are used as references. Hashes that match the blacklist indicate potential threats. VFHs can be generated with the knowledge of these whitelisted and blacklisted hash values to improve the accuracy of threat detection.

In another example, malicious actor binary file details can be utilized; more particularly, binary Fingerprinting such as the analysis of binary files' details includes studying their structure, code patterns, and functions. During VFHs generation, understanding the unique fingerprint of binary files can help in generating VFHs taking into account code patterns, and functions. Embodiments can create VFHs with attributes designed to capture and respond to the specific expected behaviors by these binaries.

In another example, malicious actors certificates can be utilized; more particularly, certificate verification. Malicious actors may attempt to use counterfeit or stolen certificates to appear legitimate. During VFHs generation, embodiments can validate certificates associated with files and processes. Suspicious or unverified certificates can prompt the creation of VFHs with specific security parameters. This also decreases false positives by allowing trusted processes to execute. Embodiments can accordingly check trusted processes with VFHs.

In another example, certificate chain analysis can be utilized. In particular, analyzing the entire certificate chain can reveal anomalies. A certificate with an irregular or untrusted chain can indicate a malicious actor's involvement. VFHs can be configured to closely analyze files associated with such certificates.

By incorporating the aforementioned malicious actor characteristics into VFHs generation, embodiments ensure that VFHs are tailored to detect and respond to specific threats.

Auxiliary Information: a wide range of auxiliary data, including but not limited to File I/O, Registry I/O data, Remote Procedure Call (RPC) calls, Local Procedure Call (LPC) data, scheduled tasks, Component Object Model (COM) server data, network activity data, and intercepted Application Programming Interface (API) data, can be incorporated into the security parameters. This auxiliary information provides valuable context for threat analysis and VFH generation.

System 100 is configured so that ML module 122 has access to virtual honeypot driver 136 so that the result of analysis can be conveyed to and used by virtual honeypot driver 136. In an alternative embodiment, the role of ML module 122 is supplemented in whole or in part by a threat-intelligence service.

In an embodiment, virtual file honeypot 134 is generated based on security parameters utilizing one or more templates. In an embodiment, templates are pre-designed patterns for creating VFHs and can be utilized as described in the following manner.

Template Generation: Templates for VFHs are created based on the known characteristics and behaviors of the trusted processes and the expected interaction patterns within the computing system environment. These templates can include predefined file structures, access permissions, and interactions with other components.

Adaptation to Security Parameters: Templates are then adapted to the specific security parameters determined by ML module 122. This adaptation involves configuring the VFHs to align with the unique characteristics and potential threats identified within computing system 100.

Dynamic Customization: VFHs can be dynamically customized based on the current security parameters of computing system 100. This customization can involve adjusting file types, contents, access controls, and other attributes to closely mimic real system files while incorporating elements designed to attract and detect potential malware injections.

Scalability and Variability: Templates allow for the scalable and variable creation of VFHs to ensure that they closely match the expected diversity and complexity of the computing system environment.

In an embodiment, real-world data is used to retrain one or more ML modules. In an embodiment, ML module 122 can be retrained to generate VFHs based on security parameters based on newly collected data corresponding to confirmed malware injections.

Though behavior engine 120 and ML module 122 are depicted as separate components in FIG. 1 for ease of explanation, behavior engine 120 and ML module 122 can be implemented in a single module or engine, or multiple modules or engines (e.g. distributed or cloud-based). In another embodiment, and as explained further with respect to FIG. 3, a security module can be implemented with the functionality of both behavior engine 120 and ML module 122.

In another embodiment, virtual file honeypot 134 is itself generated by a generative AI module according to the generated VFHs security parameters. For example, the generative AI module can be pretrained based on a large language model (LLM) with a training dataset associated or gathered with the CS, binary module characteristics, and the binary module threat information (such as a threat history). In an embodiment, threat history can be obtained from a threat intelligence service or from one or more internal databases.

In an embodiment, generation of VFHs by artificial intelligence includes the use of advanced machine learning techniques to create VFHs that are strategically designed to attract potential threats, such as ransomware or malware, while minimizing the risk to the actual system. For example, VFHs can be generated by AI according to the following operations.

In an example operation, data collection and analysis using training data is utilized. To create effective VFHs, the AI system uses a diverse and representative training dataset. This dataset can include information about genuine files, directories, and system behaviors within the computing environment. The dataset also includes historical threat data and known malicious behaviors.

In another example operation, feature extraction is utilized. The AI system processes the training data to extract relevant features and characteristics. These features may include file structures, content, metadata, access permissions, timestamps, and historical threat patterns, for example. Feature extraction aims to capture the diversity of files and system behaviors.

In another example operation, machine learning models are utilized. In a particular example, the AI responsible for VFH generation is often a generative AI module. This module can be based on various machine learning models, including deep learning techniques like Generative Adversarial Networks (GANs) or Variational Autoencoders (VAEs). These models demonstrate an ability to generate data that closely mirrors the characteristics of the training data.

In another example operation, the AI is trained. The generative AI module is trained using the training dataset, which includes benign data. During training, the AI learns to generate files that mimic the characteristics found in the training data.

In another example operation, VFH security parameters alignment is utilized. In particular, the generative AI module takes the VFH security parameters into account when creating VFHs. These security parameters are designed to enhance the system ability to detect malicious activities. For example, such parameters can specify that certain VFHs should exhibit the operating system files characteristics to attract ransomware attacks.

In another example operation, dynamic parameter adjustment is utilized. Security parameters can be dynamically adjusted based on the evolving threat landscape. AI can adapt VFH generation to changes in the types of threats or tactics employed by malicious actors.

In another example operation, deployment and monitoring is utilized. In particular, AI-generated VFHs are strategically placed. In one example, the AI-generated VFHs are not placed within the CS, instead the AI-generated VFHs are provided in the response upon request of the potentially malicious injected thread. AI-generated VFHs can be mixed with real system files, making it challenging for potential threats to distinguish between the two.

In another example operation, machine learning model refinement is utilized. In particular, the AI system continues to learn and adapt based on its interactions with potential threats. Embodiments can retrain machine learning models to improve the accuracy and effectiveness of VFH generation and threat detection.

Accordingly, by utilizing AI in VFH generation, embodiments can create VFHs that closely resemble the computing system's environment while being optimized for the detection of malicious activities.

Figure 2:
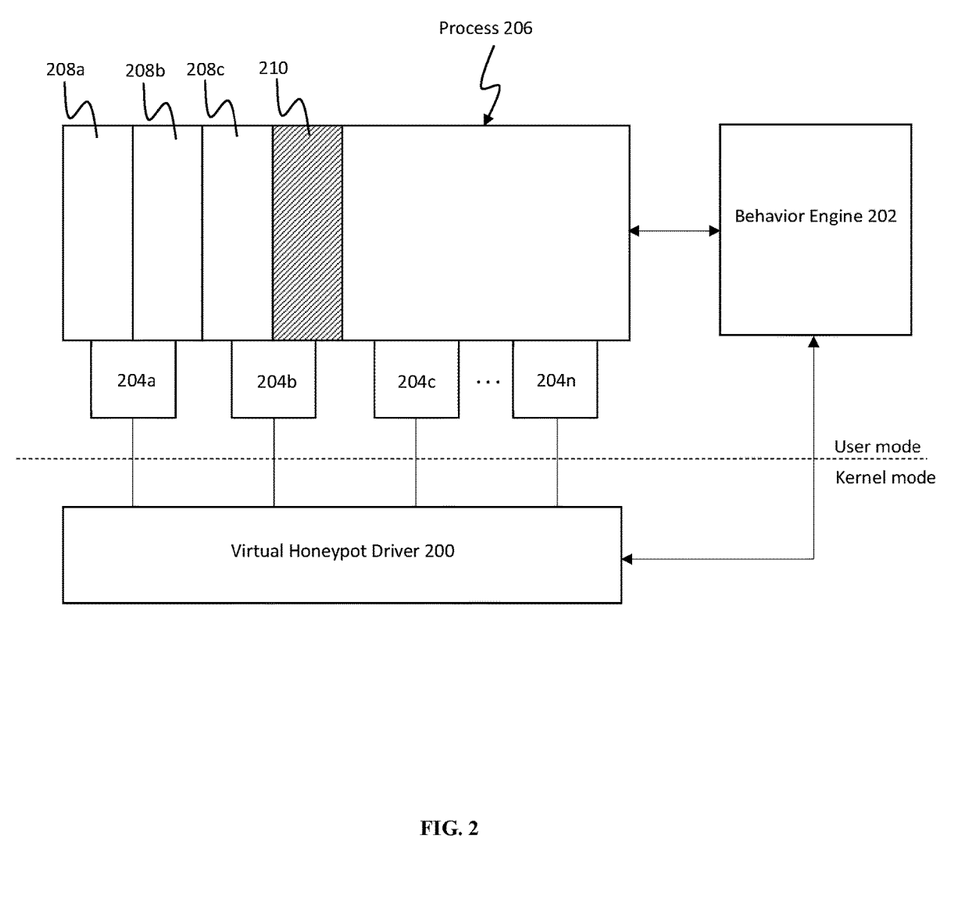
FIG. 2 is a block diagram of a portion of a system for ransomware protection, according to an embodiment.

Referring to FIG. 2, a block diagram of a portion of a system for ransomware protection is depicted, according to an embodiment. Components of the system for ransomware protection of FIG. 2 are implemented in system 100 of FIG. 1 but are shown in FIG. 2 with renumbering for ease of illustration. For example, virtual honeypot driver 200 corresponds to virtual honeypot driver 136 in FIG. 1. Likewise, certain functions described with respect to FIG. 1 are incorporated in behavior engine 202 and or control points 204a-n.

Accordingly, a system for ransomware protection includes virtual honeypot driver 200, behavior engine 202, and a plurality of control points 204a-n. Embodiments are configured to interact with process 206.

In an embodiment, behavior engine 202 is configured to identify a trusted process launched on a computing device. In an embodiment, behavior engine 202 is configured to analyze the digital signature associated with trusted process 206.

In an embodiment, virtual honeypot driver 200 is configured to identify at least one trusted process. For example, processes based on a thread creation notification as identified by functions, such as PsSetCreateThreadNotifyRoutine. The PsSetCreateThreadNotifyRoutine is a routine that registers a driver-supplied callback that is notified when a new thread is created and when the thread is terminated. Accordingly, when a malicious actor injects a thread into trusted process 206, virtual honeypot driver 200 identifies the thread or process as one to monitor.

PsSetCreateThreadNotifyRoutine also allows for logically linking the ProcessId of an injecting party to the injected process victim, thus giving the attacker's identity. In other embodiments, object manager callbacks can be utilized to identify a given process and further identify the process as trusted.

Behavior engine 202 is further configured to analyze events from virtual honeypot driver 200 and identify potentially malicious operations. Behavior engine 202 is further configured to identify a potentially malicious actor process (as the injector in case of injections) based on the aforementioned event analysis and a confidence level. In an embodiment, a stack trace analysis is used to identify processes or injected threads.

In an embodiment, callbacks allow behavior engine 202 to identify a process from which the injection is performed, for example, "CreateRemoteThread( )", IPC through usermode hooking. Accordingly, behavior engine 202 is configured to identify a potentially malicious actor process and associated characteristics by analyzing the context of at least one of the callback operations.

Behavior engine 204 is configured to detect and analyze data related to DLL Load Callbacks; for example, analyzing dynamic link library (DLL) load events and the associated processes to identify unexpected or suspicious DLL injections.

In another example, data related to Process Creation Callbacks can be detected and analyzed, including monitoring and analyzing the creation of new processes, focusing on parent-child process relationships and identifying unusual or unauthorized processes.

In another example, data related to Thread Creation Callbacks can be detected and analyzed, including observing the creation of threads within processes, especially when such threads involve remote thread creation, which may indicate a potential injection.

In another example, data related to Registry Modification Callbacks can be detected and analyzed, including tracking changes to the Windows Registry, as certain registry keys and values can be manipulated by malware to persist or hide its presence.

In another example, data related to File System Operation Callbacks can be detected and analyzed, including examining file-related operations, such as file creation, modification, or deletion, which can reveal suspicious activity like the creation of malicious files.

In another example, data related to Network Callbacks can be detected and analyzed, including monitoring network-related events and communications to identify any unexpected or unauthorized network traffic initiated by processes.

In another example, data related to Kernel Object Callbacks can be detected and analyzed, including analyzing changes to kernel objects, such as device objects, driver objects, and symbolic links, which can be manipulated by malware In another example, data related to Memory Modification Callbacks can be detected and analyzed, including detecting changes to memory regions within processes, which can uncover in-memory injection or manipulation by malicious code.

In another example, data related to interception of API Calls can be detected and analyzed, including intercepting and analyzing Application Programming Interface (API) calls made by processes to identify unusual or unauthorized API usage.

In another example, data related to Interprocess Communication (IPC) Callbacks can be detected and analyzed, including monitoring IPC mechanisms, including named pipes, sockets, and interprocess communication events, to detect suspicious communication between processes.

In another example, data related to User Mode Hooking can be detected and analyzed, including identifying instances where user-mode hooking or hooking of user-level functions is used to manipulate the behavior of processes, potentially indicating malicious intent.

In another example, data related to System Service Table (SSDT) Hooking can be detected and analyzed, including detecting unauthorized modifications to the System Service Table, which can be an indication of rootkit activity.

In another example, data related to ObRegisterCallbacks can be detected and analyzed, including involving the registration of callback functions for monitoring operations performed on Windows objects by various drivers and components. By analyzing ObRegisterCallbacks, the embodiments can detect and characterize potential malware injections, especially when such registrations are associated with suspicious or unauthorized activities. Monitoring these callback registrations can provide insights into attempts to manipulate the behavior of drivers and system objects, which may indicate the presence of malicious code.

In an embodiment, virtual honeypot driver 200 is configured to detect when processes 206 have been launched on system 100. Whenever any new processes have been started in the system, virtual honeypot driver 200 can be configured to constantly monitor all threads 208a-c, 210 in those new processes. In one implementation, virtual honeypot driver 200 is configured to identify one or more trusted processes. In some implementations, virtual honeypot driver 200 is configured to perform call stack trace or execution stack trace monitoring on one or more control points 204a-n of a thread associated with the one or more trusted processes. According to the embodiment, a particular control point 204a-n is selected as an element to analyze at the point of execution of certain file operations and other operations that virtual honeypot driver 200 intercepts, thereby covering all sources of malicious threads, regardless of their origin, under the approach that the target of the operation matters rather than the source of the malicious thread. In other words, by intercepting at the target rather than at the source(s), all sources of malicious operations can be captured. More particularly, stack trace operations can identify all processes of potentially malicious actor processes or injected threads. Accordingly, virtual honeypot driver 200, via its control points 204a-n identify the process or injected thread in the trusted process created by the potentially malicious actor on the CS.

Plurality of control points 204a-n, on which call stack trace or execution stack trace monitoring is performed, are associated with the following events or activities of trusted process 208, including file creation, file cleanup, file close, handle deprecation, file renaming, file deletion, thread creation, writing to virtual memory, and other file-related or memory-related events. In some implementations, control points 204a-n correspond to system calls exposed by the operating system for performing the above-described events or activities, such as "CreateFile( )", "DeleteFile( )", "CreateThread( )", "CreateRemoteThread( )", and "Write VirtualMemory( )". In other example events or activities, control points 204a-n are associated with cleaning up a file, closing a file, duplicating a handle, renaming a file, a registry operation, a Component Object Model (COM) operation, a Remote Procedure Call (RPC) call, or a Local Procedure Call (LPC) call. In an aspect, at least one of control points 204a-n is associated with a system call (e.g., "CreateRemoteThread( )") to create a remote thread that runs in a virtual address space of another process, such as trusted process 206.

Trusted process 206 is depicted in FIG. 2 with a plurality of threads, including benign threads 208a-208c and injected thread 210.

Accordingly, at least one of the plurality of control points 204a-n are configured to monitor injected thread 210 of trusted process 206. At least one of the plurality of control points 204a-n is further configured to detect activity of injected thread 210 at a particular control point.

In embodiments, control points 204a-n can further monitor threads 208a-208c. In an embodiment, at least one plurality of control points 204a-n can ignore non-injected processes.

Behavior engine 202 is further configured to mitigate risk to the computer system of the injected thread. For example, behavior engine 202 can generate an alert to a user and provide the user with detection results including an indication of the injected thread as a malware injection. In another example, behavior engine 202 can suspend the injected thread. In another example, behavior engine 202 can terminate the injected thread. Though not depicted in FIG. 2, as needed, behavior engine 202 can integrate with or utilize user mode resources to operate on the injected thread such as to suspend or terminate the thread, if unable to do so in kernel space. In an embodiment, virtual honeypot driver 200 can operate in kernel space on the injected thread such as to suspend or terminate the thread (such as in coordination with behavior engine 202). In another example, behavior engine 202 can perform CS recovery based on an existing snapshot. As discussed above, because VFHs are virtual, CS recovering or snapshotting does not include any VFHs.

Figure 3:
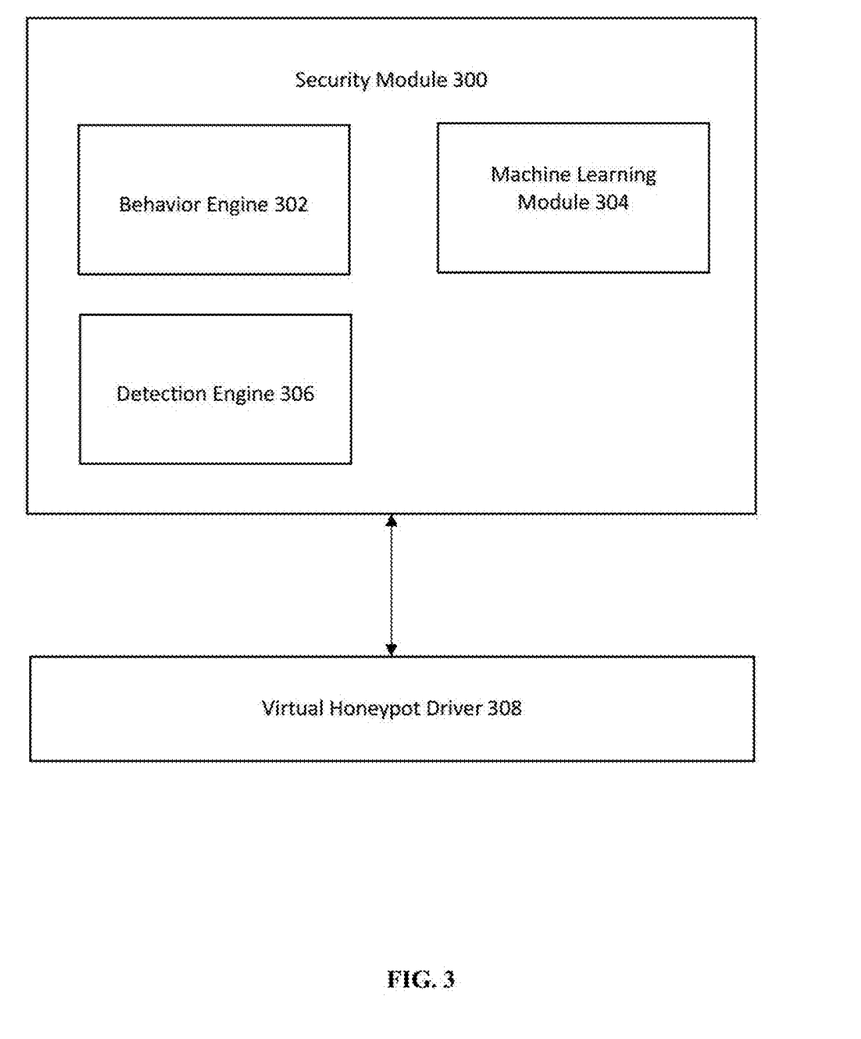
FIG. 3 is a block diagram of a portion of a system for ransomware protection, according to an embodiment.

Referring to FIG. 3, a block diagram of a portion of a system for ransomware protection is depicted, according to an embodiment. In particular, FIG. 3 depicts a security module 300 communicatively coupled to a virtual honeypot driver 308. In embodiments, virtual honeypot driver 308 is substantially similar to virtual honeypot driver 136 or 200 discussed in FIGS. 1-2.

Security module 300 generally comprises behavior engine 302, machine learning module 304, and detection engine 306.

In an embodiment, security module 300 can be implemented in system 100 of FIG. 1, as well as the portion depicted in FIG. 2. For example, as illustrated, security module 300 can be implemented with the various functions of the respective behavior engines and ML modules. For example, behavior engine 302 can be substantially similar to behavior engine 120 or 202. Machine learning module 304 can be substantially similar to ML module 122. In embodiment, detection engine 306 can utilize behavior engine 302 and machine learning module 304, but instead of behavior engine 302 calculating a confidence level for the malicious actor identification, detection engine 306 can receive appropriate information from its modules and calculate a confidence level.

Figure 4:
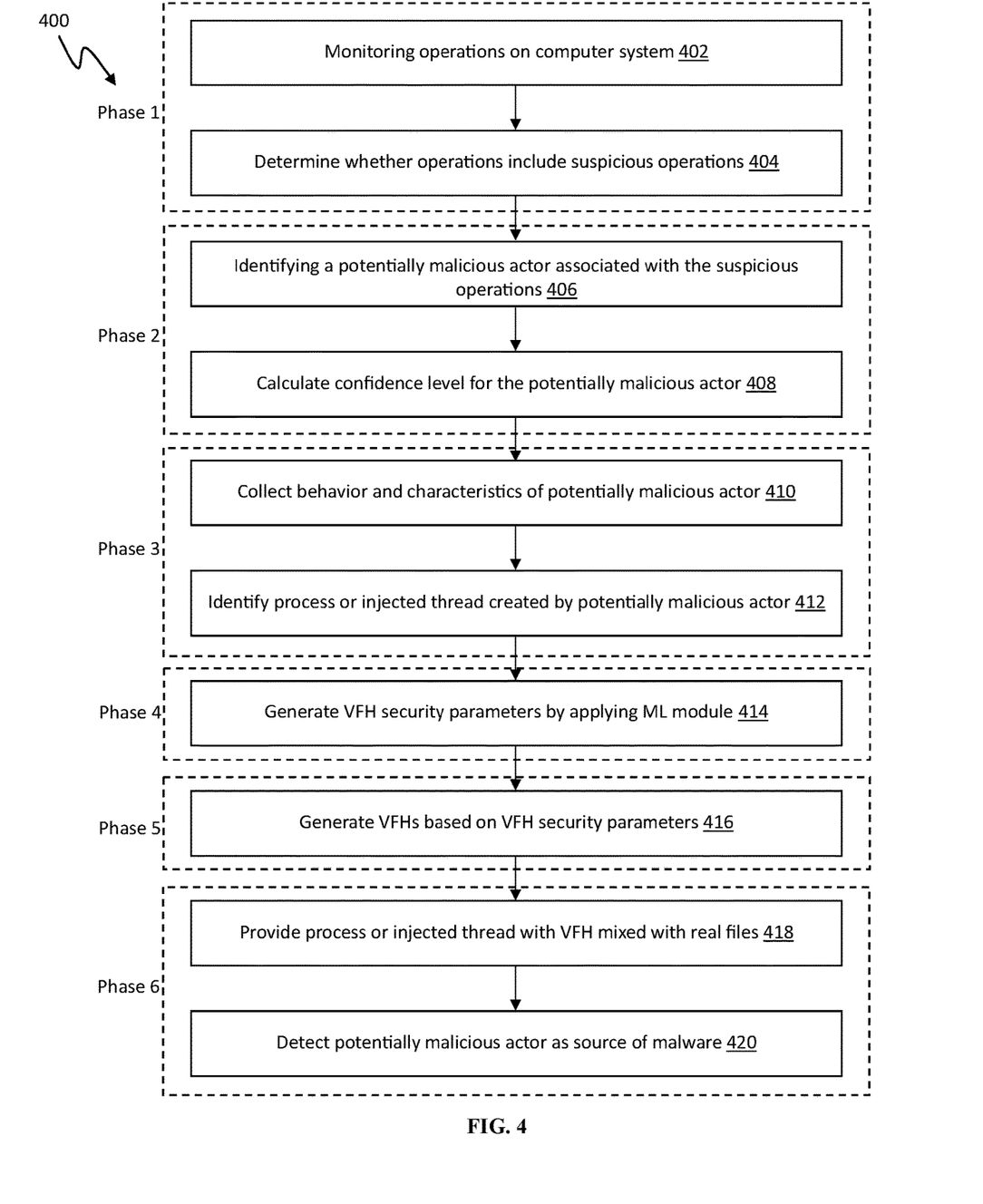
FIG. 4 is a flowchart of a method for ransomware protection in injection-based attacks, according to an embodiment.

Referring to FIG. 4, a flowchart of a method 400 for ransomware protection in injection-based attacks is depicted, according to an embodiment. In an embodiment, method 400 can be implemented by the systems depicted in FIG. 1, FIG. 2, or FIG. 3. Reference is made herein to both components of FIG. 1 and FIG. 2 for ease of discussion.

At 402, one or more operations on the computer system are monitored. For example, virtual honeypot driver 200 can monitor operations of process 206, such as operations from threads 208a-c and 210. Virtual honeypot driver 200 can subsequently package operations in the form of events and communicate events to behavior engine 120.

At 404, a determination is made as to whether the one or more monitored operations includes a suspicious operation. For example, behavior engine 202 can utilize a behavioral analysis to identify suspicious injections or suspicious processes. After receiving one or more events from virtual honeypot driver 200, behavior engine 202 can analyze the received events, and determine whether one or more operations associated with an event are suspicious as malware. In particular, behavior engine 202 can implement a behavior approach so as to identify malware without specific malware signatures (but rather, using behavior that is indicative of malware). In an embodiment, one or more policies can be used to identify suspicious operations.

At 406, a potentially malicious actor associated with the suspicious operation is identified. For example, behavior engine 202/behavior engine 120 can identify malicious actor 114.

At 408, a confidence level for the potentially malicious actor identification is calculated. For example, behavior engine 202 can calculate a confidence level corresponding to a preliminary verdict of maliciousness. When the confidence level meets a given threshold, the potentially malicious actor is associated with a preliminary indication of malware.

At 410, behavior and characteristics of the potentially malicious actor are collected. For example, behavior engine 202 can collect information to be used for generation of VFHs. More particularly, behavior engine 202 can collect behavior information and characteristics of the potentially malicious actor for targeted generation and deployment of VFHs towards the potentially malicious actor.

At 412, a process or injected thread created by the potentially malicious actor is identified. For example, a specific process or injected thread can be identified to be targeted by virtual honeypot driver 200 in coordination with respective control points 204a-n. In an embodiment, a stack trace analysis is used to identify processes or injected threads to feed them with VFHs.

At 414, VFH parameters are generated. For example, and referring also to FIG. 1, ML module 122 can be applied to at least one of CS environment information, behavior information of the potentially malicious actor, the characteristics of the potentially malicious actor, or auxiliary information.

At 416, at least one VFH is generated based on the VFH parameters. For example, virtual honeypot driver 200 can then generate one or more VFHs specific to injected thread 210 (or process, in the case of process 118). In embodiments, virtual honeypot driver 200 can generate a VFH based on the VFH parameters.

At 418, the injected thread is provided with the VFH generated at 416. For example, and referring also to FIG. 1, virtual file honeypot 134 is provided to the injected thread (e.g. injected thread 210 or injected thread 116, or process, in the case of process 118 in FIG. 1). In an embodiment at 418, the VFH is provided as part of a mix with real files.

At 420, the potentially malicious actor is determined to be a source of malware based on the interaction with the VFH presented at 418. For example, virtual honeypot driver 200 can monitor injected thread 210 interaction with one or more VFHs presented. Such interaction can be communicated to behavior engine 202. In an embodiment, behavior engine 202 can utilize a heuristic analysis to determine whether the associated actor is malware.

As illustrated in FIG. 4, method 400 can be implemented in phases. For example, Phase 1 includes operations 402 and 404. In an embodiment, Phase 1 is intended to obtain events from and identifies injects. Phase 1 is utilized to identify a potentially malicious actor in Phase 2.

Phase 2 includes operations 406 and 408. In an embodiment, Phase 2 is intended to identify a potentially malicious actor as an injector (in case of injections) based on 402 and 404 and a confidence level from 408.

Phase 3 includes operations 410 and 412. In an embodiment, Phase 3 is intended to collect information that will be used for generation of VFHs and applied to processes and threads that were created by the potentially malicious actor.

Phase 4 includes operation 414. In an embodiment, Phase 4 is intended to determine whether VFHs are needed if the calculated confidence level (Phase 2) meets a threshold (silent detect), and generating VFH security parameters based on collected information (Phase 3) and CS environment information.

Phase 5 includes operation 416. In an embodiment, Phase 5 is intended to generate VFHs based on the generated security parameters.

Phase 6 includes operations 418 and 420. In an embodiment, Phase 6 is intended to provide the identified (Phase 3) processes and injected threads associated with the malicious actor with mixed VFHs (Phase 5) and real files to detect the potentially malicious actor as malware (e.g. by performing a heuristic analysis).

Such a phased approach allows for efficiency in implementation. In an embodiment, algorithms implementing method 400 can implement meaningful exit points between the various phases. Such a structure compartmentalizes the operations such that the algorithm is not required to execute all operations, but rather, execute certain phases after one or more previous phases have been executed.

In some embodiments, the CS environment is an Industrial Control System (ICS). More particularly, an ICS is an electronic control system and associated instrumentation used for industrial process control. Control systems can range in size from a few modular panel-mounted controllers to large interconnected and interactive distributed control systems (DCSs) with many thousands of field connections. Control systems receive data from remote sensors measuring process variables (PVs), compare the collected data with desired setpoints (SPs), and derive command functions that are used to control a process through the final control elements (FCEs), such as control valves. Larger systems are often implemented by supervisory control and data acquisition (SCADA) systems, or DCSs, and programmable logic controllers (PLCs). SCADA and PLC systems are also scalable down to smaller systems with few control loops. When VFH creation takes place in an ICS, the VFH-creation process takes into account the unique characteristics of ICS, such as specialized file types, directory structures, and communication protocols commonly found in industrial settings. In embodiments, VFH creation also considers malicious actor characteristics specific to the ICS, such as ICS control events, as well as hashes, binary files, and certificates, etc. specific to the ICS actor.

In some embodiments, the CS is an Internet of Things (IoT) system. IoT generally refers to sensors, processing ability, software, and technologies that connect and exchange data with other devices and systems over the Internet or other communications networks. IoT includes electronics, communication and computer science engineering, using technology that connects the digital and physical worlds. For example, an object is fitted with sensors that monitor temperature or motion. The object can also include actuators, which receive signals from the sensors and then take action in response to those signals. As generally implemented, IoT technologies and products present an attractive attack surface for malicious actors. IoT systems also generate large amounts of data but need quick access to this data without affecting system performance. At the same time, IoT systems usually avoid traditional data storage models, where large amounts of data are stored in one place. For an IoT system, the VFH-creation process considers the distinctive features of IoT devices and networks, which can include different file types, naming conventions, and communication patterns compared to ICS. In embodiments, for an IoT system, VFH creation also considers malicious actor characteristics specific to the IoT, such as Internet network-based actors, as well as hashes, binary files, and certificates, etc. specific to the IoT actor.

The VFH-creation process works similarly for other CS environments by incorporating distinctive features of at least one of the environment, malicious actor characteristics specific to the particular environment (as actors can be communicatively coupled to a first CS environment different than a second CS environment), as well as hashes, binary files, and certificates, etc. specific to the actor and auxiliary information into the VFHs. For example, the CS environment may be a Building Automation Systems (BAS). BAS often have limited storage resources. Virtual file honeypots are a particularly effective security solution for BAS to minimize the storage footprint while maintaining protection against ransomware threats. BAS, also known as building management systems (BMS) or building energy management systems (BEMS), are typically used to control a building's heating, ventilation and air conditioning (HVAC), electrical, lighting, shading, access control, security systems, and related systems. These systems combine the control of various building automation functions with common control interfaces. For example, a smart building system connects sensors and devices to work in coordination to share data for managed building ecosystems in real time. Leveraging building data and applying artificial intelligence and machine learning (AI/ML) to the data makes the building both programmable and responsive to the needs of the users and the building manager. More particularly, the VFH can be created for low or limited resource components unique to a BAS.

Healthcare Control Systems (HCS) are another example of systems with distinctive features that can be incorporated into VFHs. These systems are traditionally used in healthcare settings, often with limited storage capabilities, that provide software and mobile applications combining real-time, workflow control technologies with best practices used in manufacturing and transportation. HCSs can improve collaboration, patient outcomes, surgeon outreach, utilization, revenue, and profit. Some healthcare organizations have various types of specialized hospital information systems such as electronic health records (EHR) systems, e-prescribing systems, practice management support systems, clinical decision support systems, radiology information systems and computerized physician order entry (CPOE) systems. Virtual file honeypots enhance the security of these systems without significant storage overhead. In embodiments, for an HCS system, VFH creation considers the specific HCS environment, behavior information of a potentially malicious actor, such as an actor with control of a CPOE operating on EHRs, or other HCS actor characteristics.

Yet another system type with distinctive features that can be incorporated into VFHs is that of telecommunications infrastructures. Telecommunication infrastructures are known to have limited storage capacity, especially in remote or rural areas. At the same time, telecommunications infrastructures comprise the physical medium through which internet traffic flows, including telephone wires, above and below-ground cables, submarine cables, satellites, microwaves, and mobile technology including latest generation mobile networks such as 5G. Network infrastructure refers to the hardware and software that enable network connectivity and communication between users, devices, applications, and the internet. Telecommunications infrastructure services provide setup, maintenance, and consulting for data and voice communications technologies. Examples of telecommunications infrastructure services include optical fiber installation, cell tower site location, radio antenna testing, installation of standard phone equipment and data networks. These systems present attractive attack surfaces for malicious actors. Virtual file honeypots serve as a viable security measure for these systems because of reduced storage requirements. In embodiments, for a telecommunications system, VFH creation considers malicious actor characteristics specific to the telecommunications infrastructure, such as a telecommunication-networked actor, as well as other telecommunications infrastructure actor characteristics.

Transportation control systems provide another example of a distinctive system for the creation of VFHs. Such systems generally have limited storage resources due to their specialized nature. Transportation control systems are used to manage and optimize flow of traffic on roads, highways, and similar transportation networks. Transportation control systems use sensors, cameras, and communication networks to collect real-time data on traffic conditions and vehicle movements. This data is analyzed and used to control traffic signals, variable message signs, and other traffic management devices. Transportation control systems can also be used to manage public transportation networks, such as buses and trains. These systems can provide real-time information on vehicle locations and arrival times, allowing passengers to plan their journeys more effectively. Transportation control can also be used to optimize routes and schedules, improving the efficiency of public transportation networks. Virtual file honeypots offer an efficient way to protect these systems without increasing the storage footprint. In embodiments, for a transportation control system, VFH creation considers the specific transportation control system environment, malicious actor characteristics specific to the transportation environment, such as a low-resource actor, as well as other transportation actor characteristics.

In embodiments, VFHs can be created for enterprise security systems. Enterprise security is a multi-faceted concern that includes both the internal or proprietary business secrets of a company as well as the employee and customer data related to privacy laws. Enterprise security is focused on data center, networking, and web server operations, including for social engineering risks. In embodiments for a transportation control system, VFH creation considers the specific enterprise environment, malicious actor characteristics specific to the transportation environment, such actors with access to enterprise security, as well as other enterprise actor characteristics.

In embodiments, VFHs can likewise be created for consumer security systems and similarly consider the specific consumer environment, malicious actor characteristics specific to consumer security, such as a consumer-user facing actors, as well as other consumer security system actor characteristics.

The invention claimed is:

1. A method for protecting a computing system (CS) against ransomware attacks using virtual file honeypots (VFHs) under virtual honeypot driver control, the method comprising: monitoring one or more operations on the CS; determining whether the one or more operations include any operations that are suspicious according to a policy; identifying a potentially malicious actor associated with the one or more operations that are suspicious; calculating a confidence level for the potentially malicious actor identification; collecting behavior information and characteristics of the potentially malicious actor, wherein characteristics include at least one of: a certificate; a hash of a file, a binary file, or a reputation; identifying at least one process or injected thread in a trusted process created by the potentially malicious actor on the CS; when the confidence level is above a predefined threshold, generating VFH security parameters by applying a machine learning module to at least one of: a CS environment information, behavior information of the potentially malicious actor, the characteristics of the potentially malicious actor, or auxiliary information; generating a plurality of VFHs based on the security parameters; providing the at least one process or injected thread in a trusted process with the plurality of VFHs mixed with real system files; and detecting the potentially malicious actor as malware by performing a heuristic analysis.

2. The method of claim 1, wherein calculating the confidence level for the potentially malicious actor identification is performed by matching potentially malicious actor operations using a machine learning module applied to operations on the CS over a predetermined period of time.

3. The method of claim 1, wherein calculating the confidence level for the potentially malicious actor identification is performed by using PE analysis with a machine learning module trained on confirmed ransomware detections.

4. The method of claim 1, wherein calculating the confidence level for the potentially malicious actor identification is performed by analyzing a certificate of the potentially malicious actor by comparison to a list of known potentially malicious certificates.

5. The method of claim 2, further comprising: retraining the machine learning module to generate the VFH security parameters based on newly collected data corresponding to confirmed malware detections.

6. The method of claim 1, further comprising at least one of: generating an alert to a user and providing the user with detection results including an indication of the injected thread as malware injection; suspending the injected thread created by the malicious actor or the process of the malicious actor; terminating the injected thread; or performing CS recovery based on an existing snapshot, wherein the CS recovering does not include any of the plurality of VFHs.

7. The method of claim 1, wherein generating a plurality of VFHs based on the security parameters is performed by a generative AI module according to the VFH security parameters.

8. The method of claim 4, wherein the generative AI module is pretrained based on a large language model (LLM) with a training dataset associated with the CS, binary module characteristics, and a threat history of the binary module.

9. The method of claim 1, wherein generating a plurality of VFHs based on the security parameters utilizes at least one template.

10. The method of claim 1, wherein auxiliary information includes at least one of File I/O, Registry I/O data, Remote Procedure Call (RPC) calls, Local Procedural Call (LPC) data, a scheduled task, Component Object Model (COM) server data, network activity data, and intercepted Application Programming Interface (API) data.

11. The method of claim 1, wherein the identifying the potentially malicious actor is performed by analyzing context of at least one of callback operations: DLL Load Callbacks, Process Creation Callbacks, Thread Creation Callbacks, Registry Modification Callbacks, File System Operation Callbacks, Network Callbacks, Kernel Object Callbacks, Memory Modification Callbacks, Interception of API Calls, Interprocess Communication (IPC) Callbacks, User Mode Hooking, System Service Table (SSDT) Hooking, or ObRegisterCallbacks.

12. The method of claim 1, wherein VFH security parameters includes information about at least one of a CS type, a CS name, a CS version, an operating system type, or an operating system version.

13. The method of claim 1, wherein the CS environment information comprises information about at least one of: file types and extensions; common file names, file content, or directory structure; access permissions of files and directories within the CS; creation, modification, and access timestamps within the CS; sensitive data within the CS; file interactions with other components in the CS; regulatory and compliance requirements of the CS; or past cybersecurity incidents or known vulnerabilities within the CS environment.

14. A system for protecting a computing system (CS) against ransomware attacks, the system comprising: one or more processors; a virtual honeypot driver configured to monitor one or more operations on the CS, a behavior engine configured to: determine whether the one or more operations include any operations that are suspicious according to a policy, identify a potentially malicious actor associated with the one or more operations that are suspicious, calculate a confidence level for the potentially malicious actor identification, collect behavior information and characteristics of the potentially malicious actor, wherein characteristics include at least one of: a certificate; a hash of a file, a binary file, or a reputation, and identifying at least one process or injected thread in a trusted process created by the potentially malicious actor on the CS; a machine learning module operably coupled to the virtual honeypot driver and configured to generate VFH security parameters by applying a machine learning module to at least one of: a CS environment information, behavior information of the potentially malicious actor, the characteristics of the potentially malicious actor, or auxiliary information when the confidence level is above a predefined threshold, wherein the virtual honeypot driver is further configured to: generate a plurality of virtual file honeypots (VFHs) based on the security parameters, and provide the at least one process or injected thread in a trusted process with the plurality of VFHs mixed with real system files, and wherein the behavior engine is further configured to detect the potentially malicious actor as malware by performing a heuristic analysis.

15. The system of claim 14, wherein calculating the confidence level for the potentially malicious actor identification is performed by matching potentially malicious actor operations using a machine learning module applied to operations on the CS over a predetermined period of time.

16. The system of claim 14, wherein calculating the confidence level for the potentially malicious actor identification is performed by using PE analysis with a machine learning module trained on confirmed ransomware detections.

17. The system of claim 14, wherein calculating the confidence level for the potentially malicious actor identification is performed by analyzing a certificate of the potentially malicious actor by comparison to a list of known potentially malicious certificates.

18. The system of claim 14, wherein the virtual honeypot driver is configured to generate the plurality of VFHs based on the security parameters using a generative AI module according to the VFH security parameters.

19. The system of claim 14, wherein the CS is: an Industrial Control System (ICS); an Internet of Things (IoT) system; a Building Automation Systems (BAS); a Healthcare Control System; a Telecommunications Infrastructure; a Transportation Control System; an Enterprise Security System; or a Consumer Security System.

20. A method for protecting a computing system (CS) against ransomware attacks, the method comprising: creating a CS event by grouping at least two CS operations; determining that the CS event comprises at least one suspicious operation according to a behavior engine analysis; identifying a potentially malicious actor associated with the at least one suspicious operation; calculating a confidence level for the potentially malicious actor identification; collecting behavior information and characteristics of the potentially malicious actor; when the confidence level is above a threshold, generating virtual file honeypot (VFH) security parameters using a machine learning module; generating at least one VFH based on a plurality of security parameters; and 10detecting the potentially malicious actor as malware based on the at least one suspicious operation interaction with the VFH.

* * * * *